(12) United States Patent
Hanes

(10) Patent No.: US 8,065,510 B2
(45) Date of Patent: Nov. 22, 2011

(54) SYSTEM AND METHODS OF RETRIEVING FIRMWARE BETWEEN NETWORK LOCATIONS

(75) Inventor: David H. Hanes, Loveland, CO (US)

(73) Assignee: Hewlet-Packard Development Company, L.P., Houston, TX (US)

( * ) Notice: Subject to any disclaimer, the term of this patent is extended or adjusted under 35 U.S.C. 154(b) by 827 days.

(21) Appl. No.: 11/830,106

(22) Filed: Jul. 30, 2007

(65) Prior Publication Data

US 2009/0037717 A1 Feb. 5, 2009

(51) Int. Cl.
*G06F 9/00* (2006.01)
*G06F 15/177* (2006.01)

(52) U.S. Cl. .......................................................... 713/2
(58) Field of Classification Search ........................ 713/2
See application file for complete search history.

(56) References Cited

U.S. PATENT DOCUMENTS

| | | | |
|---|---|---|---|
| 4,625,081 A * | 11/1986 | Lotito et al. ............... | 379/88.26 |
| 6,968,369 B2 | 11/2005 | Veprinsky et al. | |
| 6,986,008 B2 | 1/2006 | Colvig et al. | |
| 7,134,044 B2 | 11/2006 | Day, III et al. | |
| 7,219,221 B2 * | 5/2007 | Chao ................................ | 713/2 |
| 7,228,415 B2 * | 6/2007 | Eschbach et al. ............. | 713/162 |
| 7,363,356 B1 * | 4/2008 | Rissmeyer et al. ............ | 709/220 |
| 7,401,247 B2 * | 7/2008 | Blam et al. ......................... | 714/4 |
| 7,406,591 B2 * | 7/2008 | Rothman et al. ................... | 713/2 |
| 7,467,295 B2 * | 12/2008 | Erickson et al. .................... | 713/2 |
| 7,478,147 B2 * | 1/2009 | Sharma et al. ................. | 709/220 |
| 2004/0133771 A1 * | 7/2004 | King et al. ...................... | 713/100 |
| 2006/0265582 A1 | 11/2006 | Fan et al. | |
| 2006/0288202 A1 | 12/2006 | Doran et al. | |
| 2007/0254710 A1 * | 11/2007 | Kanagala et al. ............. | 455/557 |
| 2007/0260868 A1 * | 11/2007 | Azzarello et al. ................ | 713/2 |
| 2008/0046548 A1 * | 2/2008 | Doran et al. .................. | 709/222 |
| 2010/0008507 A1 * | 1/2010 | Galante et al. ................ | 380/278 |

FOREIGN PATENT DOCUMENTS

| | | |
|---|---|---|
| JP | 2006172098 | 6/2006 |
| JP | 2006172098 A | 6/2006 |
| KR | 10-2004-0091392 | 10/2004 |

OTHER PUBLICATIONS

Deutsches Patent—und Markenamt, DE Office Action dated Dec 6, 2010—English translation, Application No. 112008001773.5, filed Jun. 17, 2008.
Deutsches Patent—und Markenamt, DE Office Action dated Dec 6, 2010, Application No. 112008001773.5, filed Jun 17, 2008.
IPO, Office Action dated Jun. 21, 2011, Application No: GB1001248.2, filed Jan. 26, 2010, PCT/US2008/007584, In'tl Filing date Jun. 17, 2008.

* cited by examiner

*Primary Examiner* — Mohammed Rehman

(57) ABSTRACT

A system comprises a processor and non-volatile storage coupled to the processor. The non-volatile storage comprises firmware that is executable by the processor. The processor determines whether the firmware is available to be executed. If the firmware is not available to be executed, the processor determines a location across a network and retrieves a second firmware image from that location.

17 Claims, 1 Drawing Sheet

SYSTEM AND METHODS OF RETRIEVING FIRMWARE BETWEEN NETWORK LOCATIONS

BACKGROUND

Networking various computers, printers, network-attached storage (NAS) devices, and other types of devices is ubiquitous. Implementing computer networks is becoming popular in small offices and home environments. The NAS device comprises a non-volatile storage medium such as a hard disk drive that is shareable by the various computers on the network. A NAS device has code (e.g., firmware) that is loaded during initialization of the NAS device and executed by a processor in the NAS device to bestow the NAS device with some, or all, of its functionality. The firmware may become unavailable due to, for example, corruption of the firmware itself or a malfunctioning of the hard drive on which the firmware is stored. If the firmware is unavailable, the NAS device is generally unusable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of one or more components and comprises, for example, a computer, a subsystem within a computer, a network-attached storage device, a subsystem within a network-attached storage device, and a networked combination of one or more network devices.

DETAILED DESCRIPTION

Figure 1:
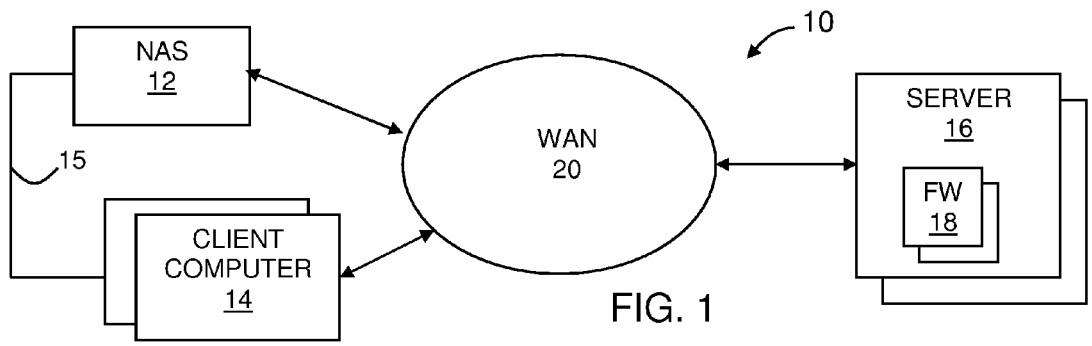
FIG. 1 shows a system in accordance with various embodiments.

FIG. 1 shows a system 10 in accordance with various embodiments. As shown, system 10 comprises a network-attached storage (NAS) device 12, one or more client computers 14, and one or more server 16 coupled together via wide area network (WAN) 20. The NAS 12 comprises non-volatile storage which can be shared by any one or more client computers 14 over a local area network (LAN) 15. The NAS 12 communicates with the client computers 14 over the LAN 15 and to the server 16 via the WAN 20. In various embodiments, each client computer 14 comprises a desktop computer, a portable computer (e.g., a notebook computer, a handheld computer) or other type of computing device that, for example, can write data (e.g., files) to and retrieve data from NAS 12.

The embodiments described herein are presented in the context of NAS devices. However, the concepts herein apply to devices other than NAS devices. Examples of such devices to which the disclosed principles apply comprise digital media adapters or other network devices. This scope of this disclosure applies to all such devices, not just NAS devices.

Figure 2:
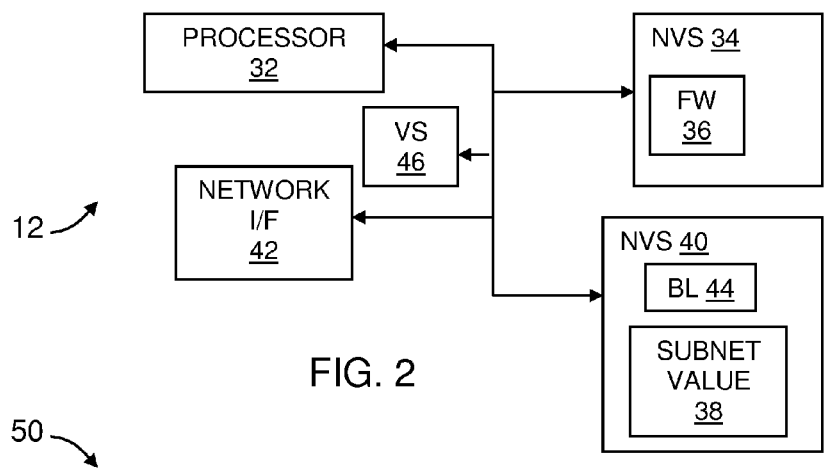
FIG. 2 shows a block diagram of a network-attached storage device in accordance with various embodiments.

FIG. 2 shows an embodiment of NAS 12. The computers 14 and servers 16 may comprise the same or similar architecture. As shown in FIG. 2, NAS 12 comprises a processor 32 coupled to a first non-volatile storage (NVS) 34, a second non-volatile storage 40, a network interface 42, and volatile storage (VS) 46. The network interface 42 provides connectivity to either or both of the LAN 15 and WAN 20. In at least some embodiments, the first non-volatile storage 34 comprises a hard disk drive. However in other embodiments, the non-volatile storage 34 may be other than a hard disk drive (e.g., Flash memory, compact disk read-only memory (CD ROM)). The non-volatile storage 34 comprises firmware 36. The firmware 36 is executable by the processor 32 and imparts some or all of the functionality of the NAS 12.

The second non-volatile storage 40 comprises, for example, Flash memory or any form of read-only memory (ROM) such as electrically-erasable programmable ROM (EEPROM). The second non-volatile storage 40 may comprise a hard disk drive or CD ROM in some embodiments. The non-volatile storage 40 stores a boot loader (BL) 44 and a subnet value 38. The boot loader 44 comprises code that is executable by the processor 32. During initialization of the NAS 12, the processor 32 begins execution of the boot loader 44. At least one of the functions performed by the boot loader 44 is to load the firmware 36 from the first non-volatile storage 34 into volatile storage 46. In at least some embodiments, volatile storage 46 comprises random access memory (RAM). A copy of firmware 36 is then executed from volatile storage 46.

It is possible that the firmware 36 becomes corrupted or that the non-volatile storage 34 on which the firmware 36 is stored becomes non-operative. In either case, the firmware 36 is not available for execution by the processor 32. The firmware 36 being unavailable for execution renders the NAS device 12 partially or entirely inoperative. In accordance with various embodiments, the boot loader 44 determines whether firmware 36 is available to be executed. If the boot loader determines that firmware 36 is not available to be executed, the boot loader 44 causes the processor to determine a location across a network to retrieve a copy of a firmware image to replace the unavailable firmware 36. The process is "automatic" in some embodiments, meaning that no user involvement is required. In some embodiments, the location across the network at which a copy of replacement firmware image is found may be at a location across the LAN 15 or WAN 20. The example of FIG. 2 illustrates that a server 16 comprises a replacement firmware copy 18 that can be provided across WAN 20 to the NAS 12.

The boot loader 44 determines whether the firmware 36 is available in accordance with any suitable technique. In at least one embodiment, the boot loader 44 computes a checksum or hash of the firmware 36 and compares the computed value to a pre-stored value (a checksum or hash previously computed based on known good version of the firmware 36). If the values do not match (the newly computed checksum/ hash and the previously pre-stored value), the firmware 36 is determined to be corrupted and thus unavailable for execution. Also or alternatively, the boot loader 44 may experience an error accessing the non-volatile storage 34 which may be indicative of an error with the non-volatile storage 34 itself. Further still, if the non-volatile storage 34 is new (e.g., the user replaced a defective non-volatile storage 34 with a new storage unit), the new non-volatile storage 34 may not have any firmware 36. The boot loader 44 detects the absence of firmware 36 and thus determines firmware 36 to be unavailable for execution.

In various embodiments, the replacement firmware copy (also referred to as an "image") located on the network may be a copy that is identical to the currently firmware 36 on the NAS. In other embodiments, the replacement firmware copy is not identical but is sufficient, at any rate, to enable the NAS device 12 to operate correctly. Once a replacement firmware copy is located and transmitted to the NAS device 12, the replacement firmware copy is loaded into non-volatile storage 34, and the NAS device is re-booted. Re-booting the NAS device 12 causes the boot loader 44 to load and begin execution of the newly replaced firmware.

In some embodiments, the boot loader 44 overwrites the current firmware 36, which may be corrupted, with the replacement firmware retrieved over the network. In other embodiments, the non-volatile storage 34 may be inoperative, and a user thus removes and replaces the non-volatile storage 34. The newly installed non-volatile storage 34 may not contain a firmware image 36 at all. In such embodiments, the boot loader 34 determines that no firmware 36 is present (i.e., firmware is unavailable for execution), retrieves a new copy of suitable firmware for execution on the NAS device 12, stores the retrieved firmware on the newly installed non-volatile storage 34, and re-boots the NAS 12 to thereby cause the newly loaded firmware to be executed.

In various embodiments, the boot loader 44 accesses (e.g., is encoded with or otherwise retrieves from any of the storages 34, 40, or 46) an identifying value that identifies the NAS 12 or its firmware 36. Examples of such a value comprise a serial number of the NAS device 12, a model number of the NAS 12, a revision identifier of the firmware 36, etc. The boot loader 44 uses this identifying value to locate a suitable replacement firmware copy on the network. Locations on the network (e.g., websites) store and make available one or more firmware copies to boot loaders 44 of NAS devices 12. Each firmware copy at such network locations also has an identifying value associated therewith that is indicative of the NAS device 12 or NAS device firmware 36 for which that firmware copy is suitable. In some embodiments, the boot loader 44 compares the NAS device's identifying value to the identifying value of the various firmware copies on the network and retrieves the firmware copy for which the identifying values match. In other embodiments, the boot loader submits a request to the network location for a firmware image that is suitable for use with the NAS device's identifying value (i.e., the NAS device's identifying value is part of the request by the boot loader 44). The network location (e.g., server 16) transmits back to the NAS device 12 the firmware image 18 whose identifying value matches the identifying value provided by the NAS device 12.

Because the firmware 36 of the NAS device 12 may be unavailable for execution, it is possible that the NAS device 12 will not have an assigned internet protocol (IP) address by the time that the boot loader 44 attempts to locate a replacement firmware image on the network. Without an IP address, communications over the network are difficult, if not impossible. In some embodiments, the boot loader 44 uses Dynamic Host Configuration Protocol (DHCP) to allocate an IP address to the NAS device 12.

In other embodiments, the NAS device 12 comprises a subnet value 48 which is stored in the non-volatile storage 40. The subnet value 38 stored in the non-volatile storage 40 comprise the NAS device's last known subnet value (i.e., the subnet value last used by the NAS device in its operative state). For example, if the NAS device's most recently assigned IP address is "192.168.0.100," the subnet value is "198.168.0." In this example and for purposes of this disclosure, the ending '100" is referred to as an "extension." The NAS device's IP address may be static, in which case the IP address does not change, or dynamic, in which case the IP address changes over time (e.g., each time the NAS device initializes and connects to the network). Each time that the IP address changes for the NAS device 12, it is the extension that changes, not the subnet value. For example, the next time an IP address is assigned to the NAS device 12, the extension may change to "2," resulting in an IP address of "192.168.0.2."

In various embodiments, before the NAS device's boot loader 44 can access the network (e.g., server 16 across WAN 20), the boot loader 44 generates a suitable IP address for use by the NAS device 12 for use in retrieving a replacement firmware image on the network. The IP address generated by the boot loader 44 should be an IP address not already in use by another device on the network. In at least some embodiments, the boot loader 44 retrieves the subnet value 38 (which comprises some, but not all, of a suitable IP address for the NAS device 12), and tries different extensions until an extension is found that results in an IP address not already in use by another device. Continuing with the example above, the boot loader may initially try "192.168.0.1" (extension of "1") as an IP address. The boot loader 44 will broadcast a "ping" message using that IP address. If the boot loader 44 receives a response, which would occur if another device is already assigned IP address 192.168.0.1, then the boot loader 44 determines that 192.168.0.1 is not a suitable IP address for the NAS device 12 to use. The boot loader then increments the extension to "2" to generate a second IP address of 192.168.0.2 and again broadcasts a ping message, this time using 192.168.0.2 as its IP address. If the boot loader 44 again receives a response, then the boot loader 44 determines that 192.168.0.2 is not a suitable IP address for the NAS device 12 to use. The boot loader 44 repeats this process, each time incrementing the IP address extension until an IP address is found for which no response to a ping message is received. The boot loader 44 uses that IP address in its attempt to locate a replacement firmware image from the network.

Figure 3:
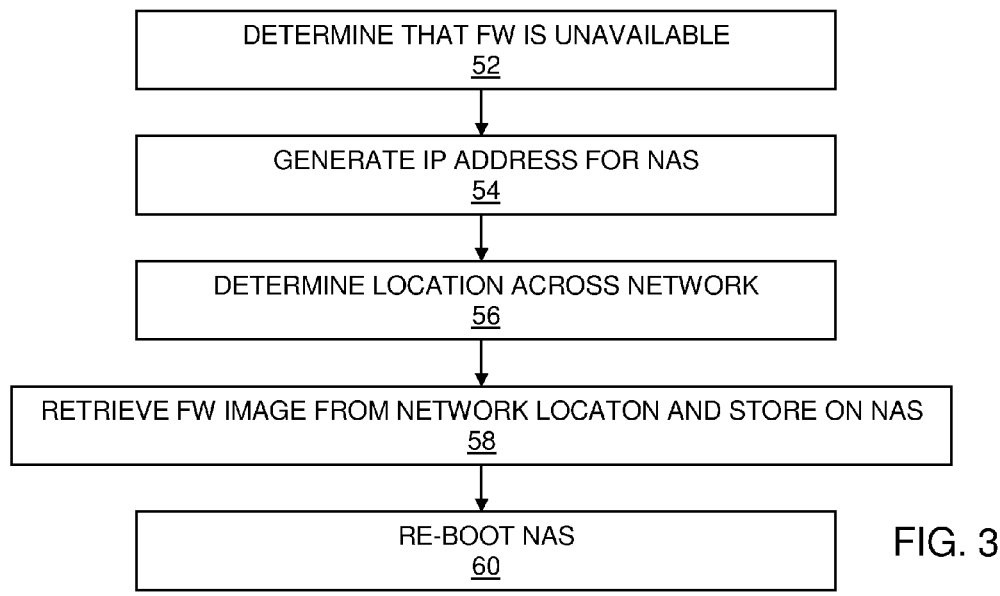
FIG. 3 shows a method in accordance with various embodiments.

FIG. 3 illustrates a method 50 in accordance with various embodiments. The actions listed in FIG. 3 can be performed in an order other than shown and two or more of the actions can be performed concurrently or be combined. At 52, the boot loader 44 determines that the NAS device's firmware 36 is not available for execution. At 54, the boot loader 44 generates a suitable IP address for use by the NAS device 12 (i.e., an IP address that is not in use by another device on the network). In some embodiments, the boot loader 44 generates the IP address after determining that the firmware 36 is unavailable. One suitable implementation of action 43 is discussed above. At 56, the boot loader determines a location to access on the network at which a possible replacement firmware image may be provided. In some embodiments, the IP address or uniform resource locator (URL) of the possible network location is encoded into the boot loader 44 itself. In other embodiments, the IP address or URL is stored in any of the storages 34, 40, or 46 of the NAS device 12. At 58, method

50 comprises a suitable replacement firmware image being found (e.g., using the identifying values as explained above), retrieved from the network location and stored on the NAS device 12. At 60, after loading the replacement firmware image onto the non-volatile storage 34 of the NAS device 12, the boot loader 44 causes the NAS device 12 to be re-booted to enable the newly retrieved and stored replacement firmware image to be executed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network attached device, comprising:
    a processor; and
    a first non-volatile storage coupled to said processor and comprising firmware that is executable by said processor;
    a second non-volatile storage coupled to said processor and comprising a boot loader;
    wherein said boot loader determines whether the firmware is available to be executed and, if the firmware is not available to be executed, said processor determines a location across a network and retrieves a second firmware image from said location; and
    wherein said boot loader generates an internet protocol (IP) address based on determining that the firmware is unavailable;
    wherein said boot loader generates the IP address by reading a subnet value in the second non-volatile storage, appending an extension to the subnet value to generate the IP address, and determining whether another device on the network already is using said IP address.

2. The device of claim 1 wherein said boot loader generates the IP address by repeatedly reading a subnet value in the second non-volatile storage, appending a different extension to the subnet value to generate an IP address, and determining whether another device on the network already is using said IP address until an IP address is found that is not already in use by another device on the network.

3. The device of claim 1 wherein said processor determines the location by retrieving an internet protocol (IP) address from said second non-volatile storage.

4. The device of claim 1 wherein said boot loader loads said retrieved second firmware image in said first non-volatile storage.

5. The device of claim 4 wherein said boot loader re-boots said system after loading said retrieved second firmware image.

6. The device of claim 1 wherein said boot loader compares an identifier identifying said system to an identifier associated with the second firmware image at said location.

7. The device of claim 6 wherein said boot loader retrieves said second firmware image by retrieving said second firmware image only if said identifiers match.

8. A method for updating firmware on a network attached device, comprising:
    storing a first firmware image on a first non-volatile storage of the network attached device;
    using a boot loader on a second non-volatile storage of the network attached device to determine that the first firmware image is unavailable to be executed;
    based on determining that the first firmware image is unavailable, using the boat loader to generate an internet protocol (IP) address;
    determining a location across a network;
    retrieving a second firmware image from said location; and
    wherein said boot loader generating the IP address by reading a subnet value in the second non-volatile storage, appending an extension to the subnet value to generate the IP address, and determining whether another device on the network already is using said IP address.

9. The method of claim 8 wherein generating the IP address comprises repeatedly reading a subnet value in the second non-volatile storage, appending a different extension to the subnet value to generate an IP address, and determining whether another device on the network already is using said IP address until an IP address is found that is not already in use by another device on the network.

10. The method of claim 8 wherein determining the location comprises retrieving an internet protocol (IP) address from the second non-volatile storage.

11. The method of claim 8 further comprising loading said retrieved second firmware image in the first non-volatile storage.

12. The method of claim 11 further comprising booting the network attached device which retrieves said second firmware image after loading said retrieved second firmware image.

13. The method of claim 8 further comprising comparing an identifier of the second firmware image at said location to an identifier identifying the network attached device in which the first firmware image is unavailable.

14. The method of claim 13 wherein retrieving said second firmware image comprises retrieving said second firmware image only if said identifiers match.

15. A system including a network attached device, comprising:
    means for determining that a first firmware image in a first non-volatile storage of the network attached device is unavailable to be executed;
    using a boot loader in a second non-volatile storage of the network attached device to generate an internet protocol (IP) address as a result of determining that the first firmware is unavailable;
    means for determining a location across a network;
    means for retrieving a second firmware image from said location; and
    means for said boot loader generating the IP address by reading a subnet value in the second non-volatile storage, appending an extension to the subnet value to generate the IP address, and determining whether another device on the network already is using said IP address.

16. The system of claim 15 further comprising means for comparing an identifier of the second firmware image at said location to an identifier associated with the network attached device in which the first firmware image is unavailable.

17. The system of claim 15 further comprising means for booting the network attached device system after said retrieved second firmware image is retrieved.

* * * * *

UNITED STATES PATENT AND TRADEMARK OFFICE
CERTIFICATE OF CORRECTION

| | |
|---|---|
| PATENT NO. | : 8,065,510 B2 |
| APPLICATION NO. | : 11/830106 |
| DATED | : November 22, 2011 |
| INVENTOR(S) | : David H. Hanes |

It is certified that error appears in the above-identified patent and that said Letters Patent is hereby corrected as shown below:

On the face page, in field (73), Assignee, in column 1, line 1, delete "Hewlet" and insert -- Hewlett --, therefor.

In column 6, line 5, in Claim 8, delete "boat loader" and insert -- boot loader --, therefor.

In column 6, line 60, in Claim 17, after "device" delete "system".

Signed and Sealed this
Twenty-third Day of October, 2012

David J. Kappos
*Director of the United States Patent and Trademark Office*